United States Patent
Martin et al.

(10) Patent No.: US 7,315,186 B2
(45) Date of Patent: Jan. 1, 2008

(54) VOLTAGE MODE DRIVER WITH CURRENT MODE EQUALIZATION

(75) Inventors: Aaron K. Martin, El Dorado Hills, CA (US); William Dawson Kesling, Davis, CA (US); Ravindran Mohanavelu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 11/145,749

(22) Filed: Jun. 6, 2005

(65) Prior Publication Data

US 2006/0290439 A1    Dec. 28, 2006

(51) Int. Cl.
*H03K 19/094* (2006.01)
*H03K 19/0175* (2006.01)

(52) U.S. Cl. .............................. 326/87; 326/27; 326/30
(58) Field of Classification Search ............ 326/26–27, 326/30, 87; 327/108–112
See application file for complete search history.

(56) References Cited

U.S. PATENT DOCUMENTS

| | | | |
|---|---|---|---|
| 6,704,818 B1 | 3/2004 | Martin et al. | |
| 6,812,733 B1 * | 11/2004 | Plasterer et al. | 326/30 |
| 2004/0119461 A1 | 6/2004 | Caper et al. | |
| 2005/0035780 A1 * | 2/2005 | Yamada et al. | 326/33 |
| 2005/0068060 A1 * | 3/2005 | Ooshita et al. | 326/21 |

* cited by examiner

*Primary Examiner*—Anh Q. Tran
(74) *Attorney, Agent, or Firm*—LeMoine Patent Services, PLLC; Dana B. Lemoine

(57) ABSTRACT

An equalized driver includes a voltage mode driver to drive data on a conductor and a current mode driver to provide equalization.

14 Claims, 8 Drawing Sheets

VOLTAGE MODE DRIVER WITH CURRENT MODE EQUALIZATION

FIELD

The present invention relates generally to driver circuits, and more specifically to equalized driver circuits.

BACKGROUND

Electrical signals may become attenuated as they travel through conductors. To counteract the effects of attenuation, the amplitude of a signal may be increased or decreased based on the contents of the signal prior to transmission. This process may be referred to as "equalization" or "pre-emphasis."

DESCRIPTION OF EMBODIMENTS

Figure 1:
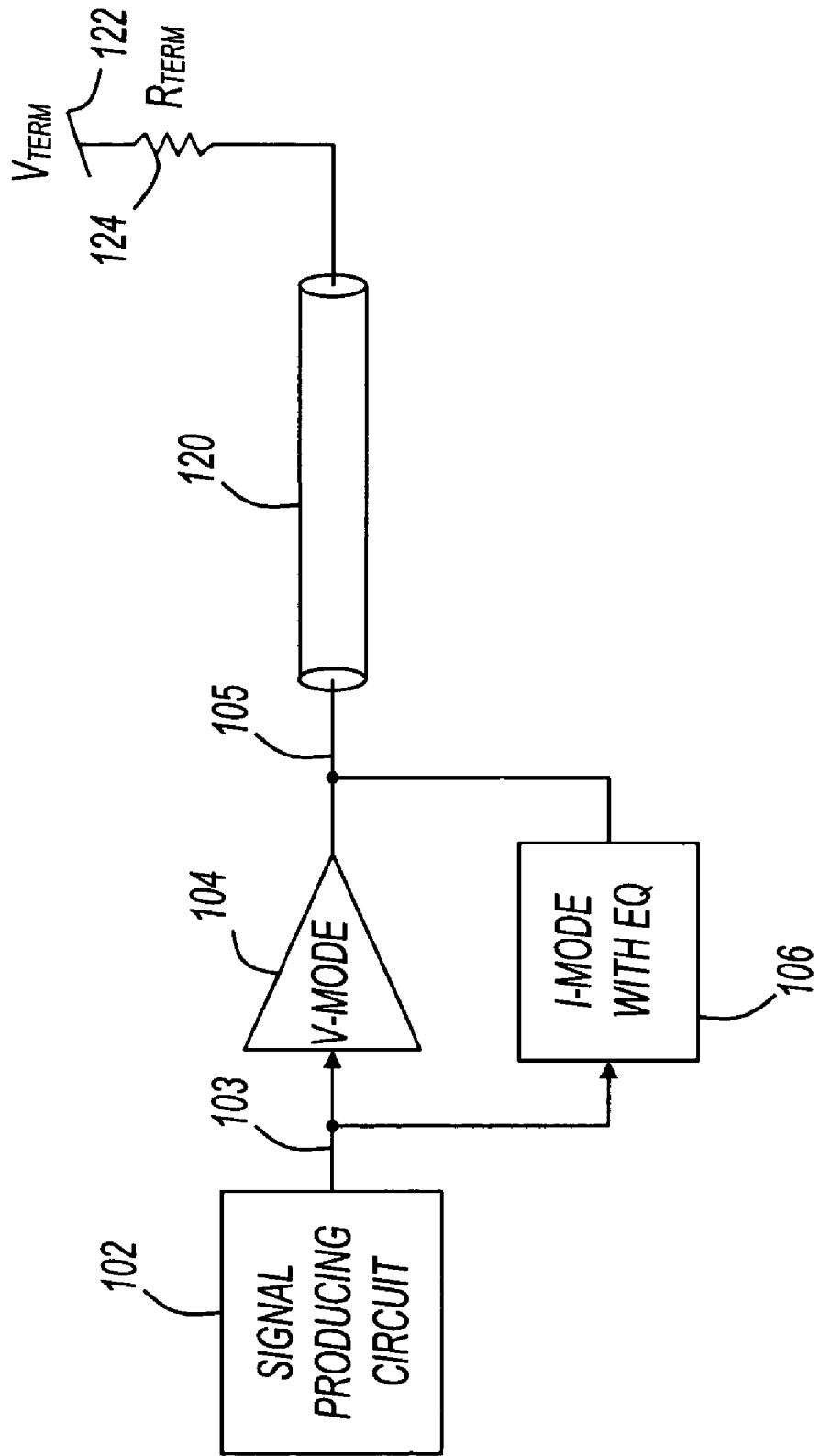
FIG. 1 shows a diagram of an equalized driver.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of an equalized driver. The equalized driver includes voltage mode "V-mode" driver 104 and current mode "I-mode" equalization driver 106. Also shown in FIG. 1 are signal producing circuit 102, conductor 120, voltage termination $V_{TERM}$ node 122, and termination resistance $R_{TERM}$ 124.

Voltage mode driver 104 is a device that receives a signal on node 103 and drives a digital voltage signal on node 105. Node 105 is coupled to conductor 120, and the digital voltage signal propagates to the far end of conductor 120 where it is terminated into $R_{TERM}$ and $V_{TERM}$.

Signal producing circuit 102 may be any type of circuit capable of producing a signal to be received by voltage mode driver 104. For example, signal producing circuit may include any analog or digital circuit that can create a signal recognizable by voltage mode driver 104.

Conductor 120 may be a conductor inside an integrated circuit or may be a conductor outside an integrated circuit. For example, in some embodiments, conductor 120 may be a data line or bus line within an integrated circuit. In these embodiments, conductor 120 may be made of any suitable material. Examples include, but are not limited to, metal and polysilicon. Also for example, in some embodiments, conductor 120 may be a trace on a circuit board, a wire, or a cable. In general, conductor 120 may be any type of conductor capable of propagating an electrical signal.

$V_{TERM}$ and $R_{TERM}$ represent a termination on the far end of conductor 120. Although this termination is shown as a termination to a single voltage, this is not a limitation of the present invention. For example, in some embodiments, a parallel termination to more than one voltage is utilized. Further, in other embodiments, a distributed termination that terminates the signal at multiple points may be utilized. In general, any type of termination may be utilized without departing from the scope of the present invention.

Current mode equalization driver 106 provides a current mode signal on node 105 to combine with the output of voltage mode driver 104. In some embodiments, current mode equalization driver 106 includes a filter to receive the data on node 103. Based on the value of current and past data values, the filter controls the current mode driver and causes current to be conditionally driven on node 105. The filter may be an analog filter or a digital filter. Various filter embodiments are described further below as digital filter embodiments, although the invention is not so limited.

Current driven by current mode equalization driver 106 causes a voltage change on conductor 120 that combines with the voltage driven by voltage mode driver 104. By changing the voltage on conductor 120, and thereby changing the signal voltage that is applied to conductor 120, various embodiments of the present invention provide equalization. The equalization may increase the voltage or decrease the voltage to counteract attenuation due to characteristics of conductor 120.

Figure 2:
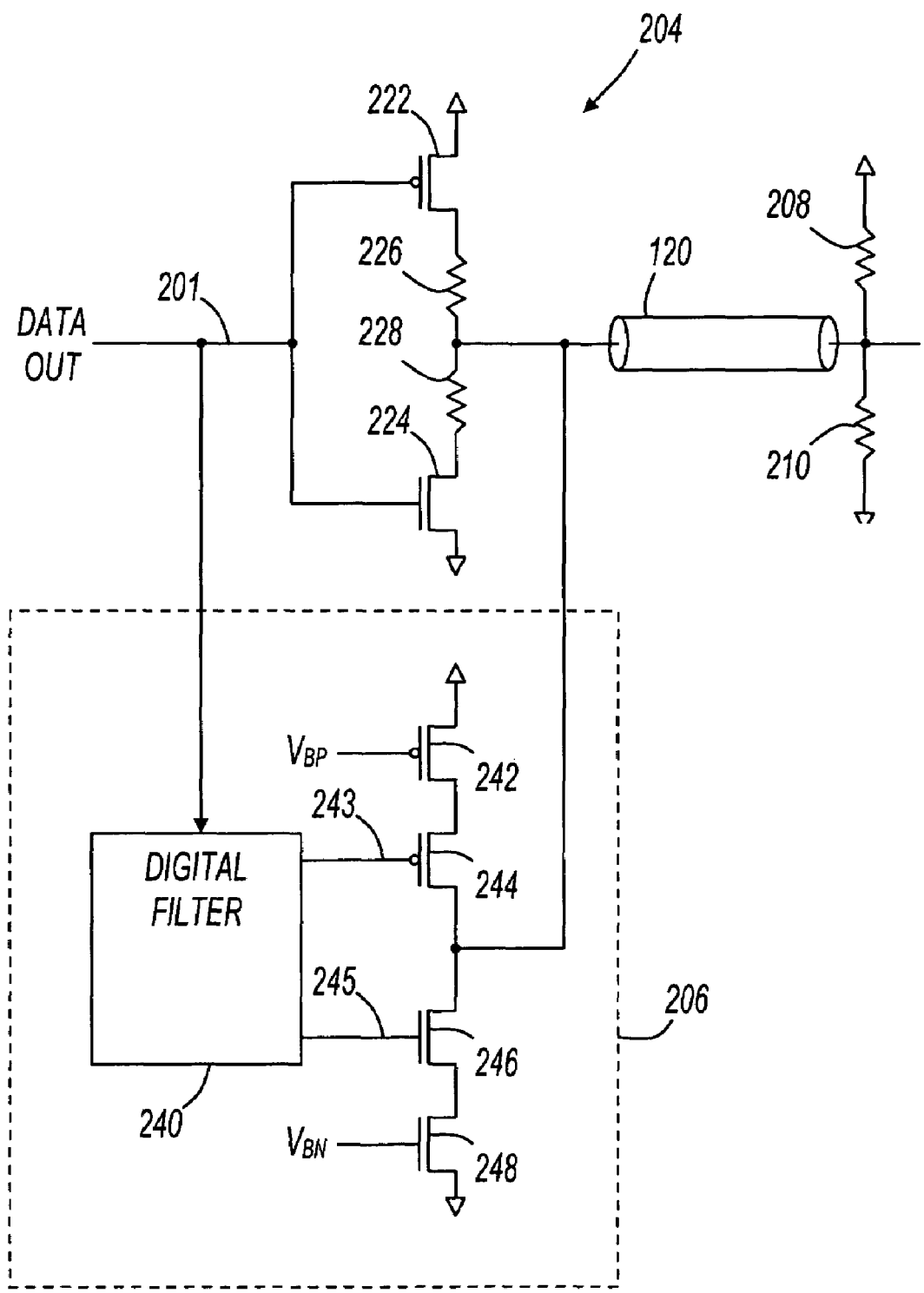
FIGS. 2 and 3 show schematics of equalized drivers.

FIG. 2 shows a schematic of an equalized driver. The equalized driver includes voltage mode driver 204 and current mode equalization driver 206. Also shown in FIG. 2 are conductor 120 and termination resistors 208 and 210. Conductor 120 is described above with reference to FIG. 1. Termination resistors 208 and 210 provide a parallel termination at the far end of conductor 120.

Voltage mode driver 204 is an example of a driver that may be utilized for driver 104 (FIG. 1). Voltage mode driver 204 includes transistors 222 and 224, and resistors 226 and 228. In operation, voltage driver 204 receives a signal on a first conductor (node 201), and drives a voltage signal on a second conductor (conductor 120). Resistors 226 and 228 provide a desired output impedance for voltage driver 204. For example, in some embodiments, resistors 226 and 228 in combination with the impedance of transistors 222 and 224 provide an output impedance of 50 Ohms. Also for example, in other embodiments, and output impedance of 100 Ohms is provided. In some embodiments, resistors 226 and 228 are omitted.

The transistors shown in FIG. 2 are shown as field effect transistors, and specifically as metal oxide semiconductor field effect transistors (MOSFETs). For example, transistor 222 is shown as a P-type MOSFET (PMOSFET), and transistor 224 is shown as an N-type MOSFET (NMOSFET). Other types of switching or amplifying elements may be utilized for the various transistors of the circuits of FIG. 2 without departing from the scope of the present invention. For example, the transistors may be junction field effect transistors (JFETs), metal semiconductor field effect transistors (MESFETs), or any device capable of performing as described herein.

Current mode equalization driver 206 is an example of a driver that can be utilized as driver 106 (FIG. 1). Current mode equalization driver 206 includes digital filter 240 and transistors 242, 244, 246, and 248. Transistors 242 and 248 each receive a bias voltage on a gate node. For example, transistor 242 receives a bias voltage $V_{BP}$, and transistor 248 receives a bias voltage $V_{BN}$. These bias voltages may be generated by any suitable means. For example, diode-connected transistors may be coupled to transistors 242 and 248 to form current mirror circuits. When biased in this fashion, transistors 242 and 248 will supply a substantially constant current when a current path exists. A current path exists through conductor 120 for current supplied by transistor 242 when transistor 244 is turned on and transistor 246 is turned off. Likewise, a current path exists through conductor 120 for current supplied by transistor 248 when transistor 246 is turned on and transistor 244 is turned off.

Transistors 244 and 246 operate as current switches based on control voltages received from digital filter 240. In response to data on node 201, digital filter 240 may control the switching operation of transistors 244 and 246. For example, digital filter 240 may provide a high voltage on node 243 to turn off switching transistor 244, or may provide a low voltage on node 243 to turn on switching transistor 244. Also for example, digital filter 240 may provide a low voltage on node 245 to turn off switching transistor 246, or may provide a high voltage on node 245 to turn on transistor 246.

Figure 3:
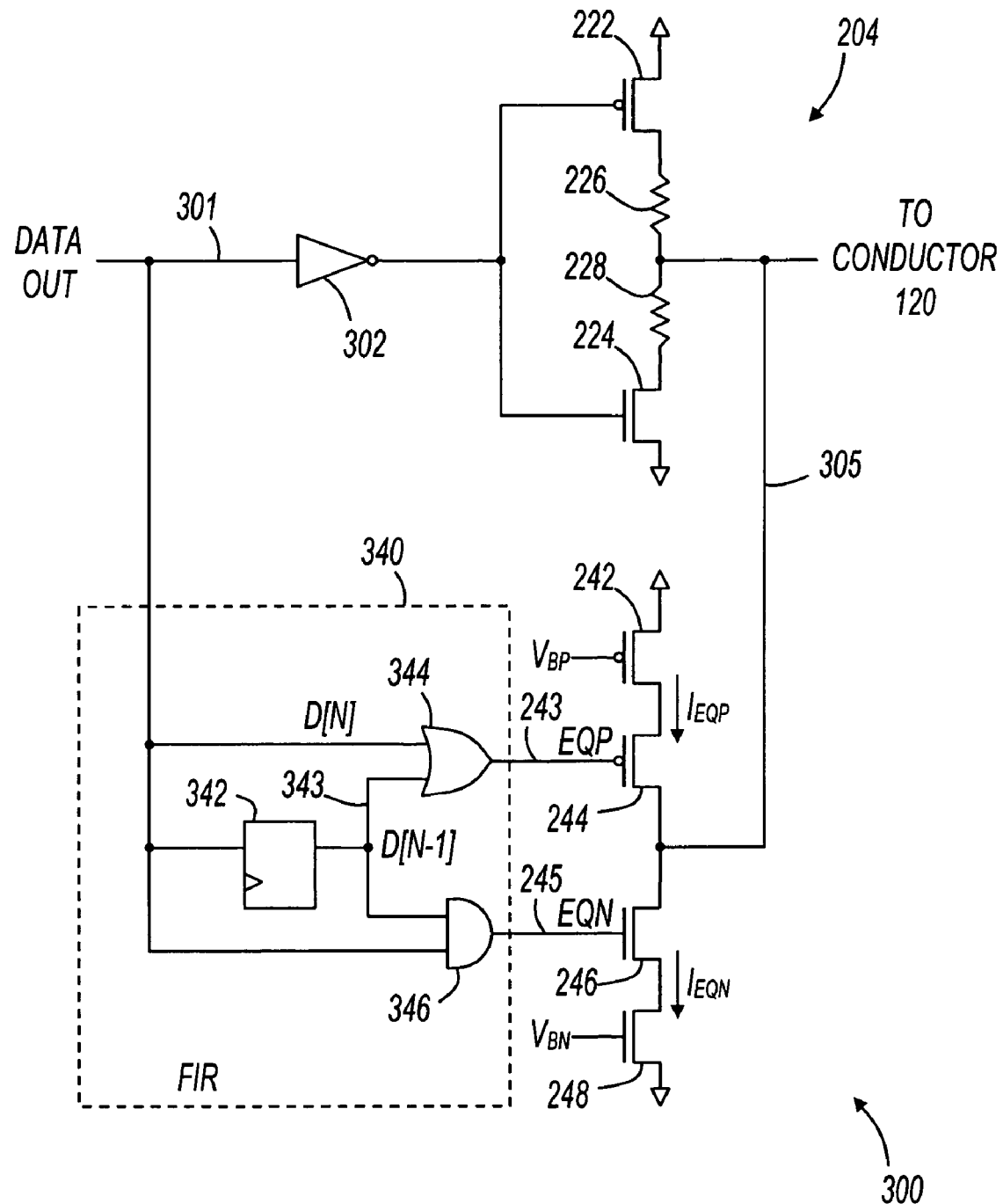

FIG. 3 shows a schematic of an equalized driver. Equalized driver 300 includes voltage mode driver 204, which is described above with reference to FIG. 2. Equalized driver 300 also includes a current mode driver segment made up of transistors 242, 244, 246, and 248, also described above with reference to FIG. 2. Equalized driver 300 also includes inverter 302. Inverter 302 is included in FIG. 3 to simplify the logic in finite impulse response (FIR) 340. Some embodiments do not include inverter 302, and some embodiments include an inverter elsewhere in the circuit to accomplish the same function.

Equalized driver 300 also includes finite impulse response (FIR) filter 340. FIR filter 340 is an example of a filter that may be used for digital filter 240 (FIG. 2). FIR filter 340 includes delay element 342 and logic gates 344 and 346. Delay element 342 delays data received on node 301, and provides that delayed data to logic gates 344 and 346 on node 343. The data received on node 301 is shown as D[N], and the delayed data is shown as D[N−1]. Logic gate 344 is an "OR" gate that drives the EQP signal on node 243 to control switching transistor 244, and logic gate 346 is an "AND" gate that drives the EQN signal on node 245 to control switching transistor 246. FIR filter 340 is a two tap filter that utilizes the current data value D[N] and a data value D[N−1] that has been delayed by one time period. In some embodiments, a filter with more than two taps is utilized. The operation of equalized driver 300 is described below with reference to FIG. 4.

Figure 4:
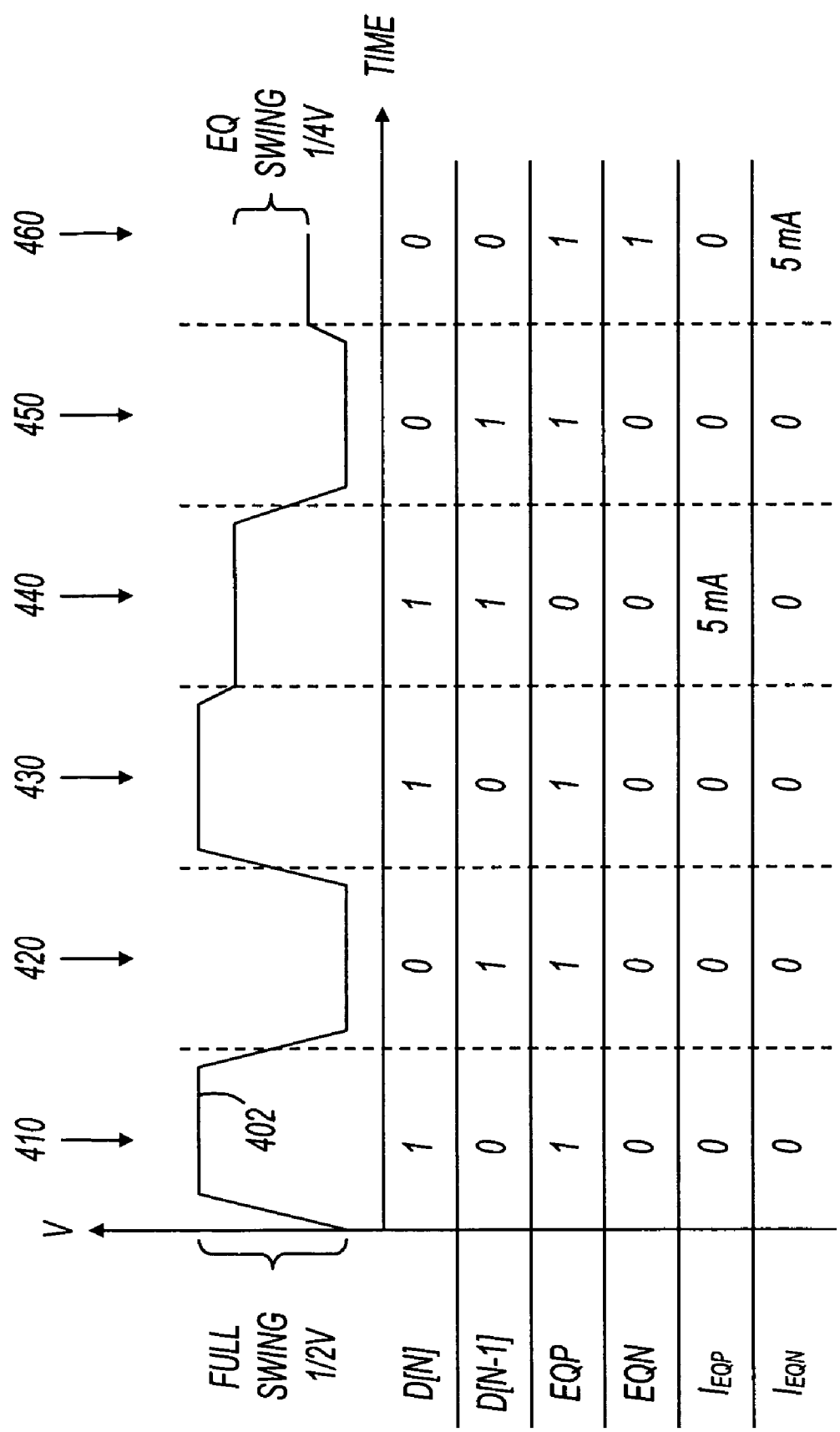
FIG. 4 shows a diagram describing the operation of the equalized driver of FIG. 3.

FIG. 4 shows a diagram describing the operation of the equalized driver of FIG. 3. Waveform 402 represents the voltage present on node 305 (FIG. 3) when the data stream D[N] is present on node 301 (FIG. 3) over time. EQP and EQN represent the digital control values on nodes 243 and 245 (FIG. 3), respectively. $I_{EQP}$ is a current that flows through conductor 120 when transistor 244 is on and transistor 246 is off. $I_{EQN}$ is a current that flows through conductor 120 when transistor 244 is off and transistor 246 is on.

At time 410, the previous data D[N−1] is low and the current data D[N] is high. As a result, EQP is high, EQN is low, and transistors 244 and 246 are both off. The current values for $I_{EQP}$ and $I_{EQN}$ are both zero in this situation. As long as D[N] alternates between high and low, EQP is high, EQN is low, transistors 244 and 246 are off, and $I_{EQP}$ and $I_{EQN}$ are both zero. This is true during times 410, 420, 430, and 450. At time 440, however, D[N] remains high. As a result, EQP is asserted low, transistor 244 is turned on, and $I_{EQP}$ is nonzero. Further, at time 460, D[N] remains low. As a result, EQN is asserted high, transistor 246 is turned on, and $I_{EQN}$ is nonzero.

In FIG. 4, both $I_{EQP}$ and $I_{EQN}$ are shown as 5 milliamps (mA), but this is not a limitation of the present invention. Currents driven by a current mode equalization driver may be any suitable value. A suitable current value may be chosen using many different criteria, including the impedance of conductor 120 and the desired voltage change on node 305.

As a result of the operation of the current mode equalization driver, the voltage swing on node 305 is reduced from ½ Volt to ¼ Volt when the data does not alternate every time period. At times 440 and 460, the voltage represented by waveform 402 is changed by ⅛ Volt, to make the total voltage swing when "equalizing" ¼ volt. The magnitude of the voltage change may be any value, and the choice of voltage change values may be influenced by many factors including the amount of attenuation in conductor 120 and the voltage swing desired at the far end of conductor 120.

Figure 5:
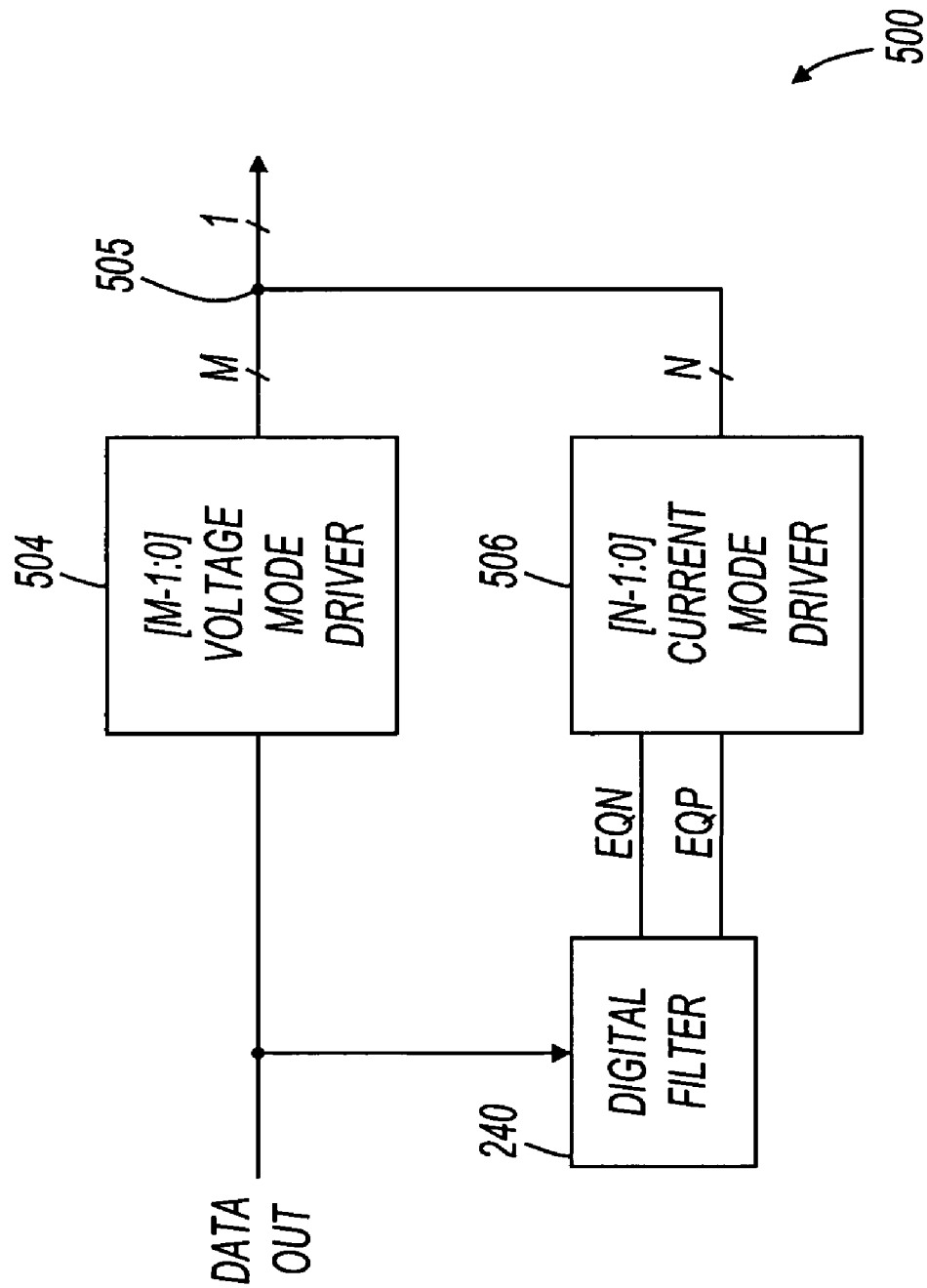
FIGS. 5 and 6 show diagrams of equalized drivers having parallel driver segments.

FIG. 5 shows a diagram of an equalized driver having parallel driver segments. Equalized driver 500 includes voltage mode driver 504, digital filter 240, and current mode equalization driver 506. Voltage mode driver 504 includes "M" separate voltage mode driver segments in parallel and includes M output nodes. The M output nodes are coupled into one conductor at node 505. Each of the parallel driver segments may be implemented as a push-pull voltage driver, examples of which are described with reference to the previous figures. The driver segments included within voltage mode driver 504 may have the same or different characteristics. For example, they may be the same size and type of driver connected in parallel to increase current output capability. Also for example, they may have different sizes or impedances to provide impedance control at the output of voltage mode driver 504.

Current mode driver 506 also includes a plurality of current driver segments. Current mode driver 506 includes "N" driver segments and has N output nodes. The N output nodes are combined into one conductor at node 505. Each of the driver segments may be implemented with stacked transistors as described with reference to previous figures. As shown in FIG. 5, current mode driver 506 receives two control signals from digital filter 240. The two control signals, EQP and EQN, are shared in common with all N current mode driver segments of current mode driver 506. The driver segments included within current mode driver 506 may have the same or different characteristics. For example, they may be the same size and type of driver connected in parallel to increase current output capability. Also for example, they may have different sizes or impedances to provide impedance control at the output of current mode driver 506.

Figure 6:
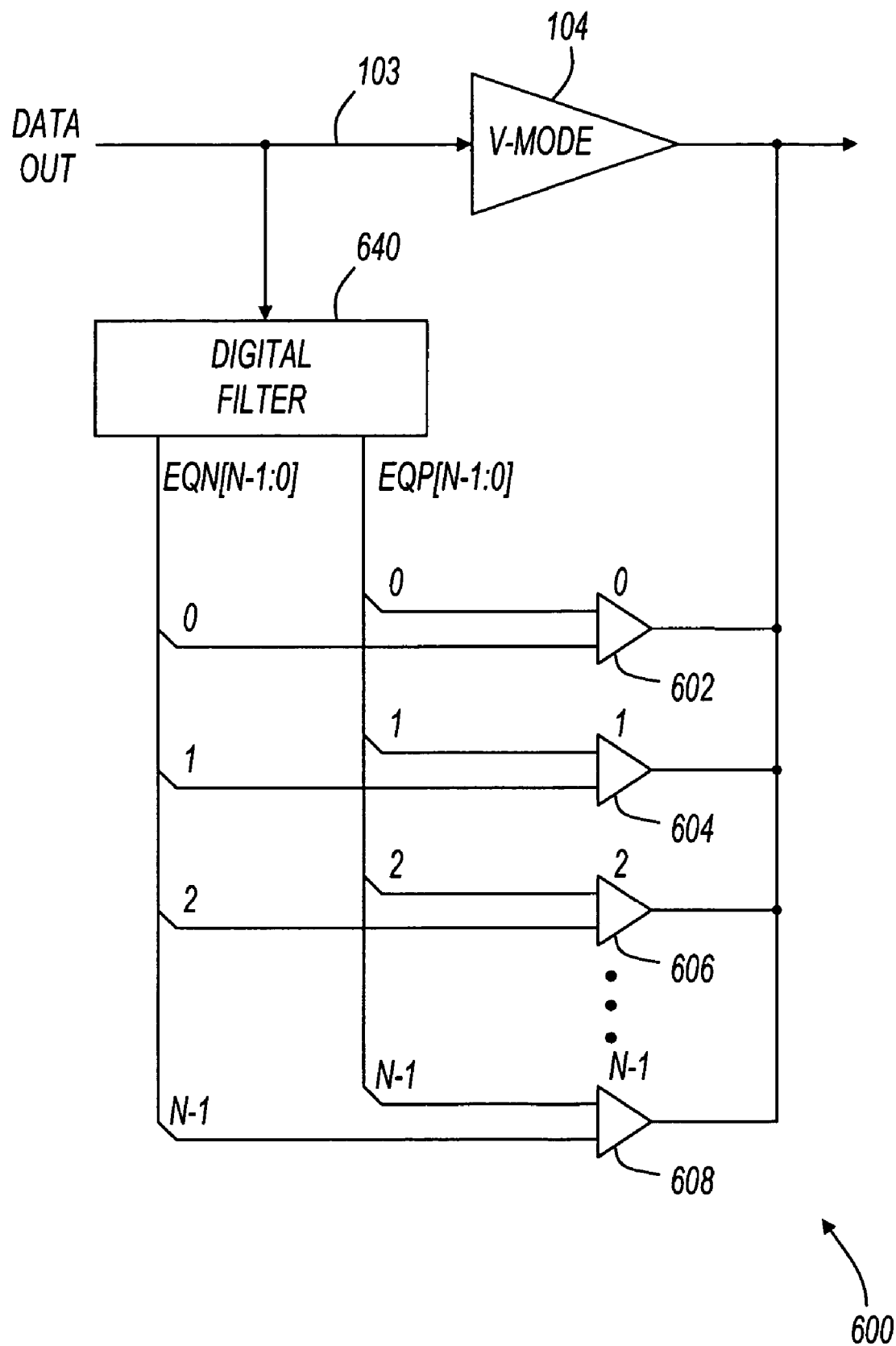

FIG. 6 shows a diagram of an equalized driver having parallel driver segments. Equalized driver 600 includes voltage mode driver 104, digital filter 640, and current mode driver segments 602, 604, 606, and 608. Voltage mode driver 104 is described above with reference to previous figures. Voltage mode driver 104 may be any of the voltage mode driver embodiments described herein, including a voltage mode driver having parallel driver segments.

Equalized driver 600 has "N" current mode driver segments having a common output node. As shown in FIG. 6, the N current mode driver segments are numbers 0 through N−1, and are also referred to by their reference designators, 602, 604, 606, and 608. Each of the current mode driver segments may be implemented using stacked transistors as described with reference to previous figures. Further, each of the current mode driver segments receives a separate EQP signal and an EQN signal to control the sourcing or sinking of current for equalization as described above with reference to FIGS. 3 and 4.

Digital filter 640 receives data on node 103 and provides separate EQP and EQN signals to the parallel current mode driver segments. For example, digital 640 provides N EQN signals shown as EQN[N−1:0], and also provides N EQP signals shown as EQP[N−1:0]. Using these N EQN and EQP signals, digital filter 640 may separately control the N current mode driver segments.

Digital filter 640 may include any number of taps with any amount of logic. For example, a three tap filter may include two delay elements and a four tap filter may include three delay elements. The number of filter taps does not necessarily correspond to the number of parallel current mode driver segments. For example, a three tap filter may include logic to provide EQP and EQN signals to five parallel current mode driver segments.

Figure 7:
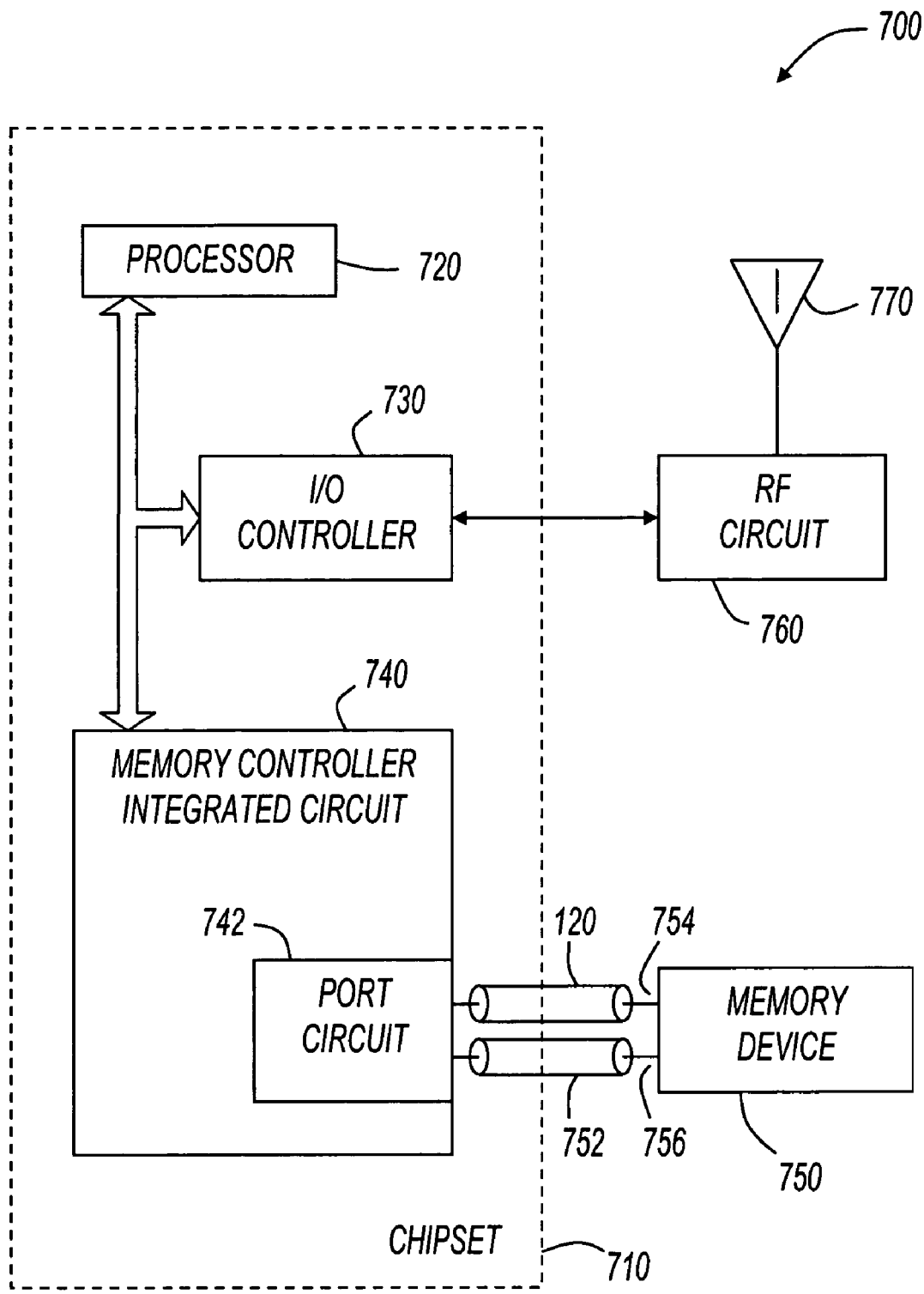
FIG. 7 shows a diagram of an electronic system in accordance with various embodiments of the present invention.

FIG. 7 shows a system diagram in accordance with various embodiments of the present invention. FIG. 7 shows system 700 including chipset 710, radio frequency (RF) circuit 760, antenna 770, memory device 750 and conductors 120 and 752. Chipset 710 includes processor 720, input output (I/O) controller 730, and memory controller 740. In operation, system 700 sends and receives signals using antenna 770, and these signals are processed by the various elements shown in FIG. 7. Antenna 770 may be a directional antenna or an omni-directional antenna. As used herein, the term omni-directional antenna refers to any antenna having a substantially uniform pattern in at least one plane. For example, in some embodiments, antenna 770 may be an omni-directional antenna such as a dipole antenna, or a quarter wave antenna. Also for example, in some embodiments, antenna 770 may be a directional antenna such as a parabolic dish antenna, a patch antenna, or a Yagi antenna. In some embodiments, antenna 770 may include multiple physical antennas.

Radio frequency circuit 760 communicates with antenna 770 and I/O controller 730. In some embodiments, RF circuit 760 includes a physical interface (PHY) corresponding to a communications protocol. For example, RF circuit 760 may include modulators, demodulators, mixers, frequency synthesizers, low noise amplifiers, power amplifiers, and the like. In some embodiments, RF circuit 760 may include a heterodyne receiver, and in other embodiments, RF circuit 760 may include a direct conversion receiver. In some embodiments, RF circuit 760 may include multiple receivers. For example, in embodiments with multiple antennas 770, each antenna may be coupled to a corresponding receiver. In operation, RF circuit 760 receives communications signals from antenna 770, and provides analog or digital signals to I/O controller 730. Further, I/O controller 730 may provide signals to RF circuit 760, which operates on the signals and then transmits them to antenna 770.

Memory controller 740 provides an interface between chipset 710 and memory devices such as memory device 750. Memory controller 740 includes port circuit 742 to communicate with memory device 750. For example, port circuit 742 is shown coupled to memory device 750 by conductors 120 and 752. Conductors 120 and 752 may be any type of conductor, including wires, traces, or other signal path. Port circuit 742 may include one or more equalized drivers as described with reference to the previous figures. For example, in some embodiments, a voltage mode signal is driven on conductor 120 along with a current mode signal to provide equalization as described above with reference to FIG. 4. Port circuit 742 and memory device 750 may include any of the equalized driver embodiments described herein.

Memory device 750 includes an integrated circuit having pads 754 and 756. Pad 754 receives a signal driven on conductor 120 by memory controller 740. Pad 756 may also receive a signal driven on conductor 752 by memory controller 740. Memory device 750 represents an article that includes a machine readable medium. For example, memory device 750 represents a random access memory (RAM), dynamic random access memory (DRAM), static random access memory (SRAM), read only memory (ROM), flash memory, or any other type of article that includes a medium readable by memory controller 740. Memory device 750 may store instructions for performing software driven tasks. Memory device 750 may also store data associated with the operation of system 700.

Chipset 710 may include any number of integrated circuits, or "chips," and may have any level of integration. For example, in some embodiments, chipset 710 includes processor 720 and memory controller 740 in separate packages. Also for example, in some embodiments, chipset 710 may include processor 720 and memory controller 740 on the same integrated circuit die, or on separate integrated circuit die packaged together.

As shown in FIG. 7, the interface between memory controller 740 and memory device includes at least one equalized driver. Equalized drivers in accordance with embodiments described herein may also be used elsewhere in system 700. For example, equalized drivers may be utilized between I/O controller 730 and RF circuit 760, between a video controller and a display (not shown), or wholly within an integrated circuit.

Example systems represented by FIG. 7 include cellular phones, personal digital assistants, wireless local area network interfaces, or any other suitable system. Many other systems uses for equalization circuits exist. For example, chipset 710 may be used in a desktop computer, a network bridge or router, or any other system without an antenna.

Equalized drivers, voltage mode drivers, current mode drivers, digital filters, and other embodiments of the present invention can be implemented in many ways. In some embodiments, they are implemented in integrated circuits as part of electronic systems. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process. For example, portions of any of the equalized driver embodiments described herein may be represented as polygons assigned to layers of an integrated circuit.

Figure 8:
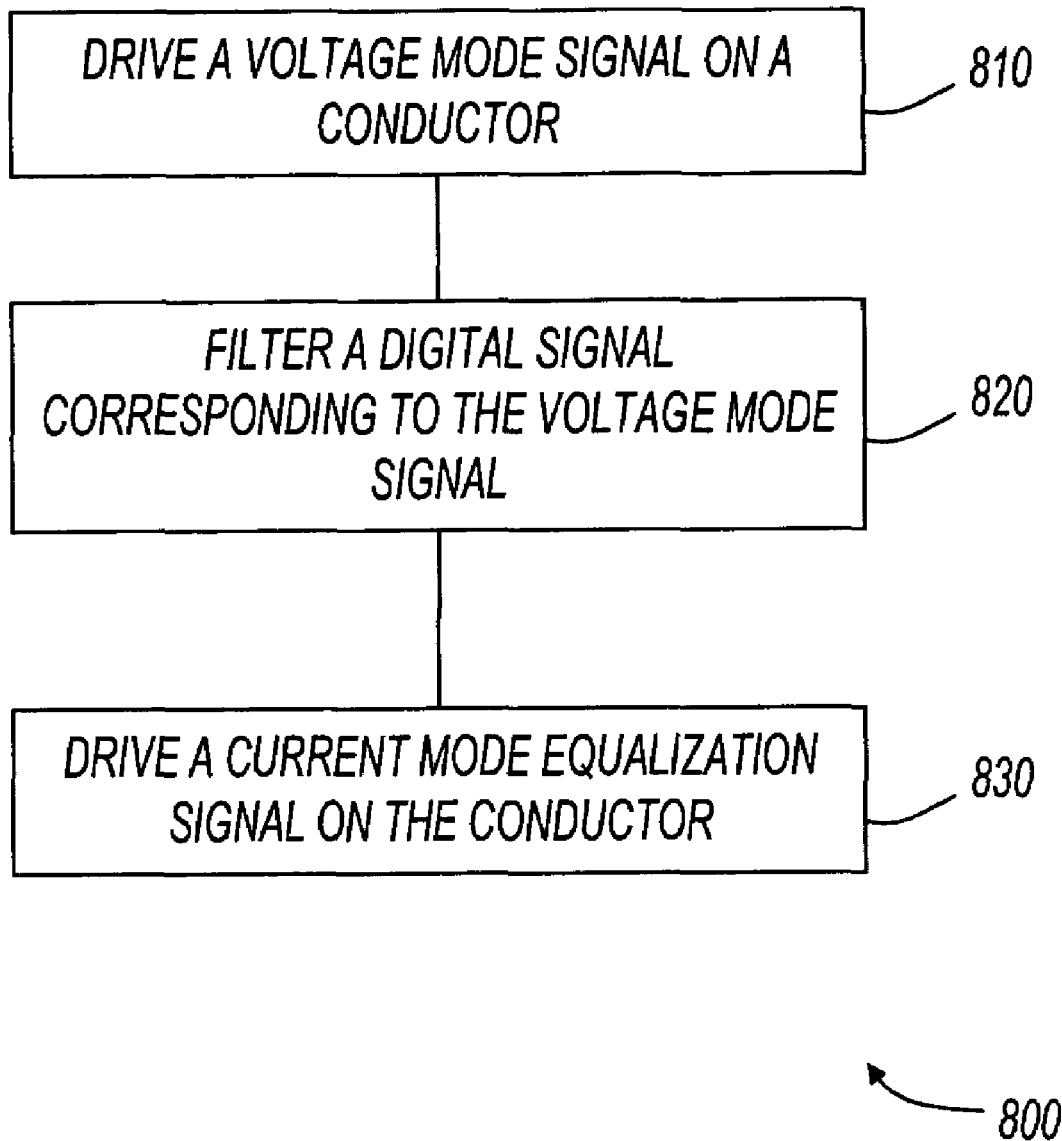
FIG. 8 shows a flowchart in accordance with various embodiments of the present invention.

FIG. 8 shows a flowchart in accordance with various embodiments of the present invention. In some embodiments, method 800, or portions thereof, is performed by an equalized driver, embodiments of which are shown in previous figures. In other embodiments, method 800 is performed by an integrated circuit or an electronic system. Method 800 is not limited by the particular type of apparatus performing the method. The various actions in method 800 may be performed in the order presented, or may be performed in a different order. Further, in some embodiments, some actions listed in FIG. 8 are omitted from method 800.

Method 800 is shown beginning with block 810 in which a voltage mode signal is driven on a conductor. This corresponds to any of the voltage mode driver embodiments driving a voltage on a conductor such as conductor 120 (FIG. 1). At 820, a signal corresponding to the voltage mode signal is filtered. In some embodiments, the digital signal is filtered with a digital filter such as digital filter 240 (FIG. 2) or digital filter 640 (FIG. 6). As a result of the filtering, control signals for a current mode driver may be produced. For example, one or more EQN signals and one or more EQP signals may be produced.

At 830, a current mode equalization signal is driven on the conductor. The current mode equalization signal may be produced by one or more current mode drivers or one or more current mode driver segments. For example, a current mode driver such as the current mode driver shown in FIG. 3 may produce a current mode equalization signal. Further a current mode driver having multiple segments such as those shown in FIG. 6 may produce a current mode equalization signal.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A circuit comprising:
   a voltage mode driver coupled to receive a first signal on a first conductor and to drive a voltage signal on a second conductor;
   a digital filter coupled to receive the first signal; and
   a current mode driver coupled to be responsive to the digital filter, and coupled to drive a current mode signal on the second conductor, wherein the current mode driver comprises a plurality of differently sized current mode driver segments coupled in parallel, and wherein each of the plurality of differently sized current mode driver segments is coupled to be responsive to a separate set of signals from the digital filter.

2. The circuit of claim 1 wherein the digital filter comprises a finite impulse response filter.

3. The circuit of claim 1 wherein the voltage mode driver comprises metal oxide semiconductor (MOS) transistors.

4. A driver circuit comprising:
   a voltage mode driver to drive a voltage mode signal; and
   a current mode equalization driver coupled in parallel with the voltage mode driver to drive a current mode equalization signal, wherein the current mode equalization driver comprises a plurality of differently sized current mode driver segments coupled in parallel.

5. The driver circuit of claim 4 wherein the current mode equalization driver comprises a digital filter.

6. The driver circuit of claim 5 wherein the digital filter comprises a finite impulse response filter.

7. The driver circuit of claim 6 wherein the finite impulse response filter comprises a two tap finite impulse response filter.

8. The driver circuit of claim 4 wherein the current mode equalization driver includes a digital filter, and each of the plurality of differently sized current mode driver segments is coupled to be responsive to a separate set of signals from the digital filter.

9. The driver circuit of claim 4 wherein the current mode equalization driver is coupled to source or sink current in response to present and past data input to the voltage mode driver.

10. A system comprising:
    a first integrated circuit having a pad to receive a signal;
    a conductor coupled to the pad of the first integrated circuit; and
    a second integrated circuit having a driver circuit wherein the driver circuit comprises a voltage mode driver to drive a voltage mode signal on the conductor and a current mode equalization driver coupled in parallel with the voltage mode driver to drive a current mode equalization signal on the conductor, wherein the current mode equalization driver comprises a plurality of differently sized current mode driver segments coupled in parallel.

11. The system of claim 10 wherein the current mode equalization driver includes a digital filter, and the plurality of current mode driver segments are coupled to be responsive to the digital filter.

12. The system of claim 10 wherein the current mode equalization driver is coupled to source or sink current in response to present and past data input to the voltage mode driver.

13. A method comprising:
    receiving a digital input signal;
    driving a voltage mode signal corresponding to the digital input signal on a conductor;
    filtering the digital input signal to produce a plurality of digital filter output signals; and
    driving a plurality of differently sized current mode driver segments with separate ones of the digital filter output signals to drive a current mode equalization signal on the conductor.

14. The method of claim 13 wherein driving a current mode equalization signal comprises sourcing or sinking current based on present and past voltage mode signals driven on the conductor.

* * * * *